(12) United States Patent
Smead et al.

(10) Patent No.: US 8,416,701 B1
(45) Date of Patent: Apr. 9, 2013

(54) SYSTEM AND METHOD FOR UPDATING FORWARDING TABLES

(75) Inventors: Steven E. Smead, Lincoln, CA (US);
John W. Flick, Sacramento, CA (US);
Cristene Sellers, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 12/433,779

(22) Filed: Apr. 30, 2009

(51) Int. Cl.
*H04L 1/00* (2006.01)
(52) U.S. Cl. .................. 370/250; 370/395.31
(58) Field of Classification Search ............ 370/331, 370/389, 254, 401, 390, 282, 279, 392, 250, 370/312, 395.31, 432, 439, 471, 473; 709/226, 709/203
See application file for complete search history.

(56) References Cited

U.S. PATENT DOCUMENTS

| | | | |
|---|---|---|---|
| 6,181,681 B1 * | 1/2001 | Hiscock et al. | 370/279 |
| 6,427,170 B1 * | 7/2002 | Sitaraman et al. | 709/226 |
| 6,980,547 B1 * | 12/2005 | Gally et al. | 370/389 |
| 7,002,955 B1 | 2/2006 | Kanuri et al. | |
| 7,388,869 B2 * | 6/2008 | Butehorn et al. | 370/401 |
| 2003/0218988 A1 * | 11/2003 | Han et al. | 370/254 |
| 2005/0041656 A1 * | 2/2005 | Dubois et al. | 370/389 |
| 2007/0133539 A1 * | 6/2007 | Kang et al. | 370/392 |
| 2007/0263553 A1 * | 11/2007 | Bharali et al. | 370/254 |
| 2008/0040419 A1 * | 2/2008 | Muth | 709/203 |
| 2008/0089253 A1 * | 4/2008 | Goto et al. | 370/282 |
| 2008/0123647 A1 * | 5/2008 | Chen et al. | 370/390 |
| 2008/0259874 A1 * | 10/2008 | Sivchenko et al. | 370/331 |
| 2012/0314704 A1 * | 12/2012 | Karaoguz et al. | 370/389 |

* cited by examiner

*Primary Examiner* — Kwang B Yao
*Assistant Examiner* — Syed M Bokhari

(57) ABSTRACT

A system and method for updating forwarding tables in a blade packet manager is provided. The blade packet manager may include master and slave blades. A master management module on the master blade monitors the slave blades. Network address entry forwarding tables are maintained on the slave blades. A periodic sweep of slave blades for activity information is performed and reports are forwarded to the master blade. The master blade propagates the reported information from the master blade to each of the slave blades to update forwarding tables on each of the slave blades.

20 Claims, 3 Drawing Sheets

SYSTEM AND METHOD FOR UPDATING FORWARDING TABLES

BACKGROUND

Neighbor Discovery Protocol (NDP) is a protocol available in the Internet Protocol (IP) Suite used with IP version six (IPv6). It operates across the IP network and link layers and is responsible for discovery of other nodes on the link, determining the link layer addresses of other nodes from their network IP address, finding available routers, and maintaining reachability information about the paths to other active neighbor nodes. NDP performs functions for IPv6 which are similar to the way Address Resolution Protocol (ARP) and Internet Control Message Protocol (ICMP) Router Discovery and Router Redirect protocols operate for IPv4. However, NDP can provide improvements over IPv4 counterparts. For example, NDP includes Neighbor Unreachability Detection (NUD), and can improve robustness of packet delivery in the presence of failing routers or links, or mobile nodes.

Neighbor Unreachability Detection (NUD) refers to determining that a neighbor is no longer reachable on a link. Neighbor unreachability detection verifies that two-way communication with a neighbor node exists. The host sends a neighbor solicitation to a node and waits for a solicited neighbor advertisement. If a solicited neighbor advertisement is received, the node is considered reachable. If there is no response, the host can repeat this process before declaring a neighbor unreachable. If a neighbor is found to be unreachable, the address entry can be deleted from a neighbor cache, such as switch or router forwarding table.

Each device maintains information about each of its neighbors and updates the information dynamically as network conditions change. The information is kept for both host and router devices that are neighbors on the network. Knowing that a device has become unreachable is important because a node can adapt behavior accordingly. In the case of an unreachable host, a device may wait a certain period of time before trying to send data packets to an unreachable host instead of flooding the network with repeated attempts to send to the host. An unreachable router, on the other hand, is a signal that the device needs to find a new router to use, if an alternate route is available.

Previous systems and methods for updating forwarding tables of network switches or routers have used NUD but have had various limitations, such as scalability and delays in reporting unreachable neighboring nodes.

DETAILED DESCRIPTION OF EXAMPLE EMBODIMENTS

Figure 1:
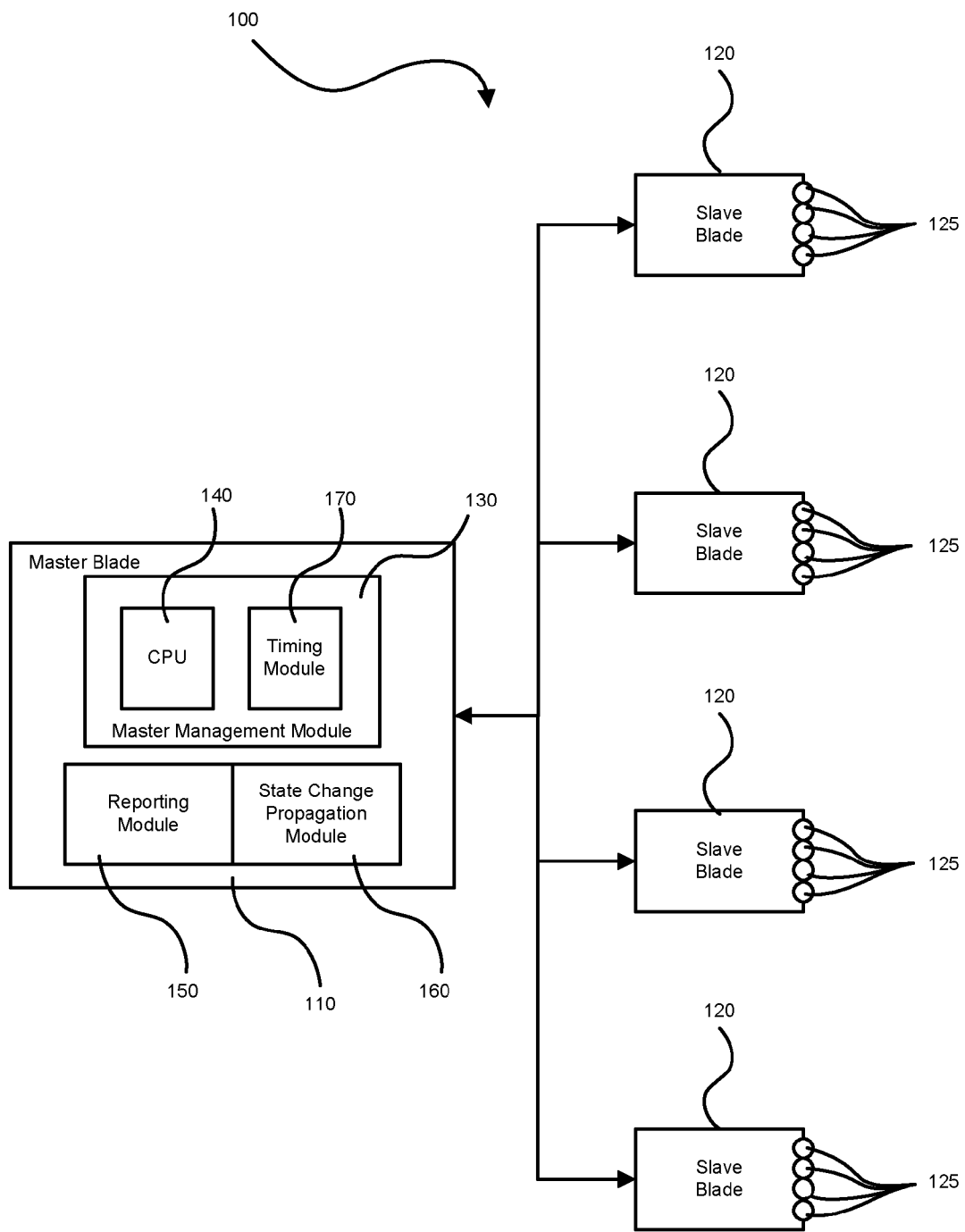
FIG. 1 is a block diagram of a system for updating forwarding tables in accordance with an embodiment.

Additional features and advantages of the invention will be apparent from the detailed description which follows, taken in conjunction with the accompanying drawings, which together illustrate, by way of example, features of the invention. Reference will now be made to the exemplary embodiments illustrated, and specific language will be used herein to describe the same. It will nevertheless be understood that no limitation of the scope of the invention is thereby intended.

Neighbor unreachability detection (NUD) detects the failure of a neighbor or the failure of the forwarding path to the neighbor. This detection can use positive confirmation that packets sent to a neighbor are actually reaching that neighbor and being processed properly by its IP layer. NUD can use confirmation from multiple sources. For example, upper-layer protocols can provide a positive confirmation that a connection is making forward progress. In other words, a confirmation is provided that data sent previously is known to have been delivered correctly. As another example, a node can send unicast neighbor solicitation messages. These messages solicit neighbor advertisements as reachability confirmation. Sending solicitation messages only to neighbors to which a node is actively sending packets can help reduce unnecessary network traffic. A host node can update a forwarding table or address cache in response to receipt of a neighbor advertisement.

Each node can maintain a neighbor cache that contains information about neighboring devices or nodes. Each time a node receives a data packet, one way reachability can be verified. It can be helpful to have a more positive confirmation via 2 way verification. 2 way verification can be achieved using the methods such as sending a unicast neighbor solicitation followed by receipt of a solicited neighbor advertisement. At this point, a neighboring node may be marked as "reachable" in the neighbor cache. If a node receives an unsolicited packet from a neighbor, the node can recognize one way reachability and record the link layer for the neighbor, but mark it as "Stale". Neighbor reachability can then be probed to confirm 2 way communication. Receiving a data packet or solicited neighbor advertisement from a neighbor only means the neighbor is reachable at that time. The more time that elapses since the last data packet was received, the greater the chance that something has happened to make the neighbor no longer reachable.

Therefore, neighbor reachability information may be considered temporary. Each time a neighbor is entered into the cache as reachable, a timer can be started. When the timer expires, the reachability information for that neighbor may be considered stale and reachability may no longer be assumed for that neighbor. When a new data packet is received from the neighbor in question, the timer is reset and the cache is again set to indicate that the device is reachable.

Internet Protocol Address Management (IPAM) is a means of planning, tracking, and managing the Internet Protocol address space used in a network. IPAM implements a NUD state machine on a master blade in a blade server. However, with IPAM, NUD states are not tracked on slave blades. IPAM implements neighbor reachability updating primarily in two ways, namely: 1) a solicited neighbor advertisement can be received as a result of sending a unicast neighbor solicitation message; and 2) when in router mode, an IPAM module is notified from routing protocols as to what router neighbors the routing protocols confirm reachability. IPAM need not probe such router neighbors because reachability has been confirmed.

In another technique for detecting unreachability of neighboring nodes with central processing unit (CPU) generated traffic, an upper layer protocol can provide positive confirmation that previously sent data was received properly and acknowledged. For example, if a next hop provided IPAM with information about the source of the routes the next hop adds, IPAM can assume positive confirmation for all Open Shortest Path First (OSPF) and Border Gateway Protocol (BGP) routes because the routing protocols will remove any adjacencies that are not responding.

A shortcoming of the above listed techniques for neighbor unreachability detection is that data packets forwarded in hardware are not "seen". In other words, if a forwarding device, such as a network switch or network router, used only hardware to forward data packets, an IPAM state machine, as described above, may not be able to properly maintain forwarding tables, or address entry caches. The machine would not be able to properly track states or state changes of neighboring nodes. Current forwarding devices rely on software to "see" data packet forwarding to maintain forwarding tables.

In accordance with an embodiment and as shown in FIG. 1, a system 100 is provided for updating forwarding tables in a blade packet manager. As used herein, a blade packet manager may refer to a network data packet forwarding device, or rather a network routing or network switching architecture. In one aspect, the blade packet manager or network data packet forwarding device can be operable as a switch and a router. In one aspect, the blade packet manager may be a core sized distributed routing or switching architecture for large scale neighbor discovery implementation with large routing tables having hundreds of thousands of entries. For example, a switching architecture may comprise a switch on a switch chassis, where each blade on the chassis is a part of the switch and each blade may comprise one or more switch components. The data plane of the blade switch or router can be a set of switching boards communicating over a fabric, and each blade may be operable to forward data packets. The blades may include a master blade 110 and slave blades 120. For example, there may be one master blade and a plurality of slave blades. The master blade may operate or host a CPU 140, routing protocol, and/or other management modules and devices. A master management module 130 on the master blade may be configured to run the CPU and otherwise manage the network data packet forwarding device. Each of the slave blades may include ports, connection points, or network connections 125 for interfacing between the slave blades and a network.

A reporting module 150 can be included on the master blade 110 or slave blades 120. In one aspect, the reporting module can be firmware or hardware and can be a part of the master management module 110. The reporting module can be configured to perform or cause to perform a sweep of the plurality of slave blades. The sweep can be performed at specified time intervals (e.g. every N milliseconds). The sweep can recognize network address entry state changes and report the state changes to the master management module. In one aspect, the network address entries may be Media Access Control (MAC) addresses, or addresses assigned to hardware to uniquely identify a specific hardware location on the network.

Figure 2:
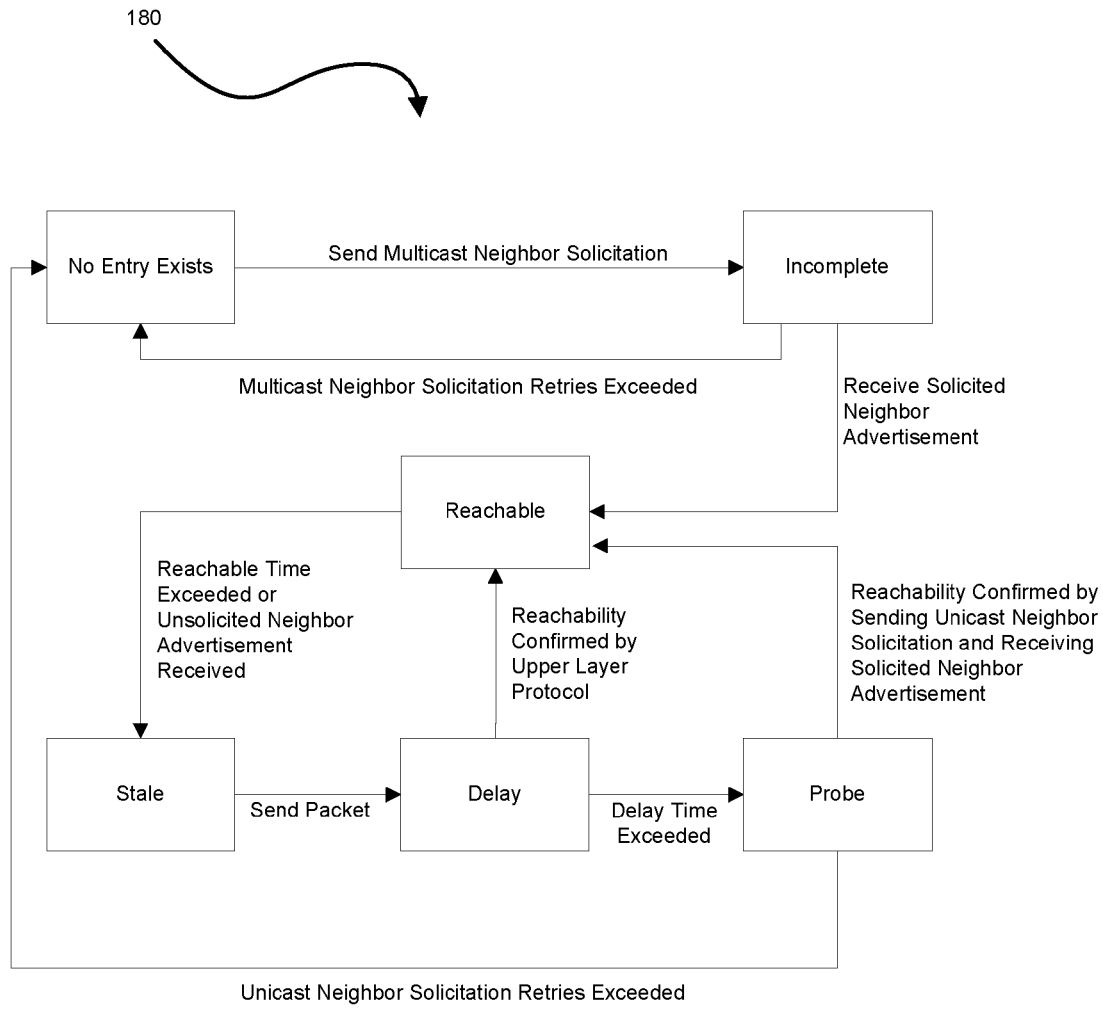
FIG. 2 is a block diagram of prior art node states and state changes in accordance with the Neighbor Discovery Protocol (NDP)

As used herein, and in accordance with an embodiment, neighbor node states or state changes may be considered as follows. It may be useful to also refer to the prior art diagram 180 of node states and state changes shown in FIG. 2.

Incomplete to Reachable.

Neighbor cache entries may be created as the result of an IPAM add neighbor call. At this point, the initial Address Resolution Protocol (ARP) request or neighbor solicitation message has been sent but a response has not been received. When the ARP/ND (Neighbor Discovery) task receives an ARP response or a neighbor advertisement message, the corresponding neighbor entry can be updated. If IPAM receives an update neighbor request with the solicited flag set, the NUD state will be updated to reachable.

Reachable to Stale.

If more time than a predetermined reachable time (such as a specific number of milliseconds) have elapsed for a neighbor, the corresponding entry state may transition from reachable to stale and the host may be a candidate to be aged if inactive for longer than the age timeout.

Stale to Delay.

When traffic is sent to a neighbor in the stale state, the state can transition from stale to delay. For software generated traffic, IPAM can determine that software is forwarding a packet to a neighbor in software. This can occur on either master or slave blades. For hardware traffic, slave blades can tap into a hardware host table aging loop and send the master blade a list of neighbors that have been active. Neighbor hosts in the stale state are candidates to be aged out of the neighbor cache to keep the table as compact as possible. In one aspect, neighbor routers may not be aged. If a neighbor table becomes full, host entries in the stale state can be replaced.

Probe.

When a NUD state is probe, an ARP request or neighbor solicitation message can be retransmitted periodically (e.g., every N number of milliseconds, where N represents a predetermined value) until a positive confirmation of reachability is received or the message has been retransmitted more than a predetermined maximum number of times. If positive confirmation is received, the state can transition to Reachable. If positive confirmation is not received for a neighbor host, the neighbor can be deleted from the neighbor cache. If positive confirmation is not received for a neighbor router, the state can transition from probe to incomplete.

Referring again to FIG. 1, a state change propagation module 160 is included on the master blade 110 and may or may not be a part of the master management module 130. The state change propagation module can be a hardware, firmware, or software module. The state change propagation module can be configured to propagate state changes reported from the reporting module from the master blade to the plurality of slave blades. In this way, forwarding tables of each of the slave blades can be updated and contain the same information.

In one embodiment, Neighbor Unreachability Detection (NUD) states are not tracked on slaves. The slaves may, however, participate in the NUD implementation by determining if a slave has recently forwarded traffic to a neighbor. If the system detects that a slave has forwarded traffic to a neighboring node, a message can be sent, as part of the report, to the master management module indicating the entry was recently active. If this entry is in the stale state, the master management module can move it to a probe state and prevent active host entries from being aged out unnecessarily.

In embodiments where NUD states are propagated to slaves, the activity reports can be filtered to minimize report sizes such that only entries that are in the stale state may be included in the activity report.

The ability of an address management module, such as an IPAM module, to detect whether a slave has forwarded traffic to a neighbor will vary on different platforms. However, in general, IPAM can use a periodic hardware aging loop to look at hardware entry hit bits to determine whether hardware has forwarded traffic to a neighbor. The system and method may be more easily implemented if the hardware provides hit bits based on next hops rather than on routes or host entries. However, hardware that provides hit bits based on routes or host entries may also be implemented as desired.

In one aspect, a timing module 170 may also be included as part of the master management module. The timing module may be a hardware device configured to track aging of network address entries and update forwarding tables. As an alternative, the timing module may be included on the slave blades. Address entries may be deleted as described above when they have expired or have been unused or unreachable for a specified period of time. State changes can be recognized during the sweep, reported to the master, and then propagated to each of the other slaves. In one aspect, the information propagated from the master to the slaves comprises changed level 3/level 2 information resulting from state changes and may not include information about actual states.

An application-specific integrated circuit (ASIC) may be included on each of the slave blades and be configured to identify incoming network data packets, perform an address lookup for incoming network data packet destinations and forward the incoming network data packets to the destinations. A network control plane can be used to set up a forwarding table for the ASIC to use in looking up packet destination forwarding addresses. An advantage of using an ASIC and a forwarding table set up in the control plane is that a control plane CPU need not be wakened or otherwise used for packet forwarding.

Figure 3:
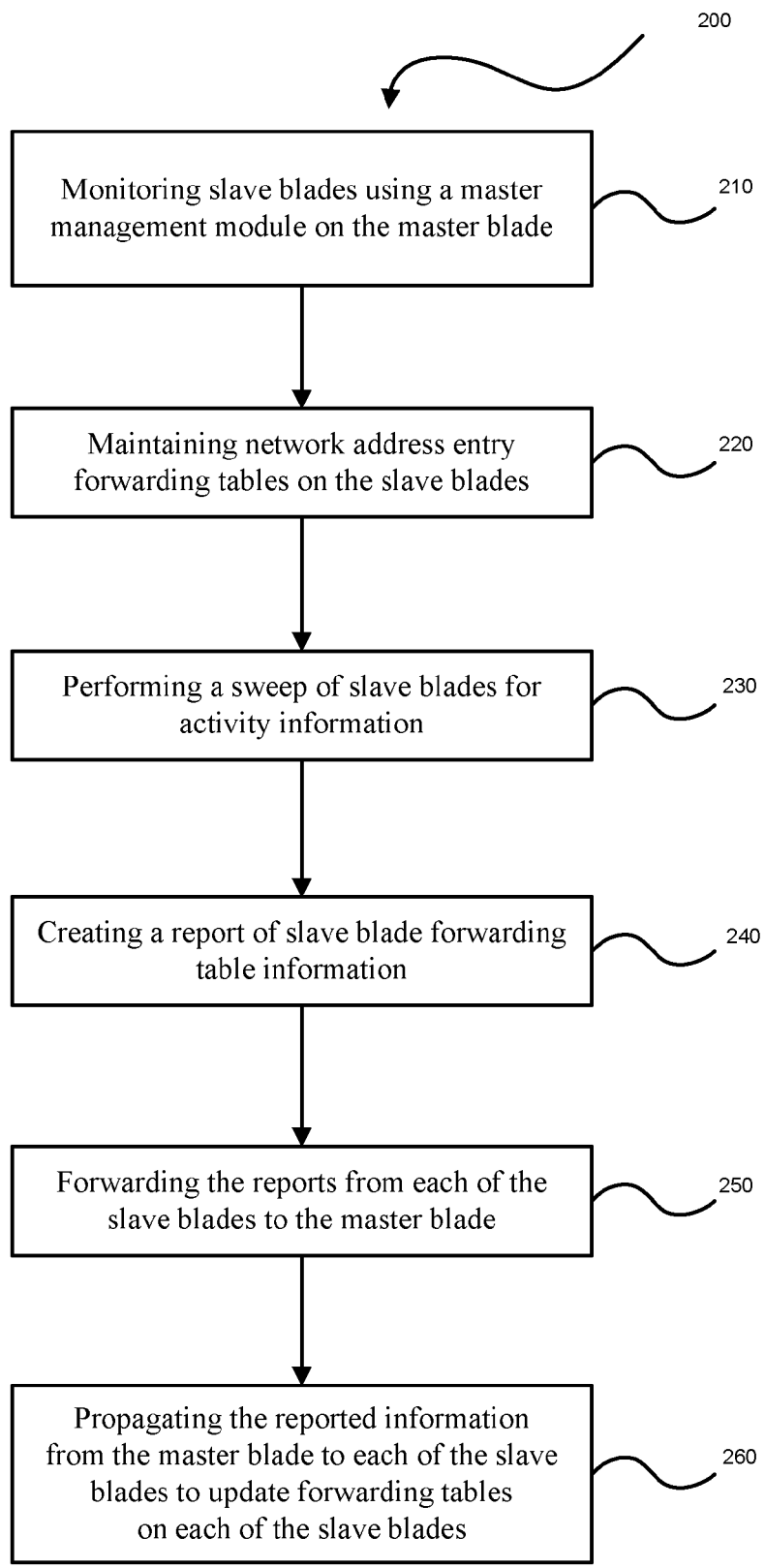
FIG. 3 is a flow chart of a method for updating forwarding tables in accordance with an embodiment.

In one embodiment shown in FIG. 3, a method 200 is provided for updating forwarding tables in a blade packet manager including master and slave blades. In one operation 210, a master management module on the master blade is used to monitor the slave blades. In another operation 220, network address entry forwarding tables are maintained on the slave blades. This maintenance can include tracking neighboring node hit bits on the slave blades (e.g., positive confirmations or responses from neighboring nodes). In another operation 230, a sweep of the slave blades is performed for activity information. The sweep can be performed over each of the blades simultaneously or can be a progressive sweep going from one blade to the next. In one aspect, two or more modules may be used to perform the sweep.

In another operation 240, a report is created of slave blade forwarding table information. In one aspect, the slave blade forwarding table information may include the entire slave blade forwarding table. However, as the table can be large, the slave blade forwarding table information may comprise only a report of network address entry state changes if desired. The report can also omit address entries without state changes. In another aspect, the slave blade forwarding table information may comprise other information desired for an intended use or application, such as aging of the address entries, or other table information as would be recognized by one having skill in the art.

In a further operation 250, the created reports can be forwarded from each of the slave blades to the master blade. A processor on the master blade can be used to merge the slave blade network address entry forwarding tables into a master network address entry forwarding table. In other words, the processor can compile the reports received from the slave blades into a single master report and update the master table. In one aspect, multiple slave blades may report similar or different state changes and the processor can remove duplicate information and add new information to the master report and/or master table.

In a later operation 260, the reported information can be propagated from the master blade to each of the slave blades. Forwarding tables on each of the slave blades can be updated using the information propagated from the master blade. In one aspect, the master management module, or the state change propagation module on the master management module, can be used to propagate information such as all or portions of the master report or the master table to the slave blades.

In one embodiment where a neighboring node is a router using routing protocol, the method may further comprise using neighbor router communication with a next hop as confirmation of neighbor reachability for an end point destination. As described above, if a next hop provided IPAM with information about the source of the routes the next hop adds, IPAM can assume positive confirmation for all Open Shortest Path First (OSPF) and Border Gateway Protocol (BGP) routes because the routing protocols will remove any adjacencies that are not responding. This can reduce time and system involvement necessary to maintain the forwarding tables.

In one embodiment, a method is provided for updating unreachability of neighboring nodes in a network switch including master and slave blades. In one operation, slave blades are monitored using a master management module on the master blade. In another operation, network address entry forwarding tables are maintained on the slave blades. In a further operation, a sweep of slave blades is performed for network address entry state change information. An individual report of network address entry state changes on each of the slave blades can be created, in another operation. In one operation, reported state changes are forwarded from each of the slave blades to the master blade. In a later operation, reported state changes are propagated from the master blade to each of the slave blades to update forwarding tables on each of the slave blades.

The system and method are scalable and may track data packets and/or neighbor addresses for tens of thousands of neighboring nodes or more. A valuable result of the system and method herein is that the system and method are supported over internet protocol version four (IPv4) Internet Protocol (IP) protocol and internet protocol version six (IPv6) IP protocol. In other words, the system and method are compatible with ARP and NDP. The system and method allow for hardware-based blade packet management.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for updating forwarding tables in a blade packet manager including master and slave blades, comprising:
   maintaining network address entry forwarding tables on the slave blades;
   monitoring slave blade forwarding tables using a master management module on the master blade;
   performing a sweep of slave blades for forwarding table activity information;
   creating a report of slave blade forwarding table activity information;
   forwarding the reports from each of the slave blades to the master blade; and
   propagating the reported information from the master blade to each of the slave blades to update forwarding tables on each of the slave blades.

2. A method in accordance with claim 1, further comprising using a processor on the master blade to merge the slave blade network address entry forwarding tables into a master network address entry forwarding table.

3. A method in accordance with claim 2, wherein propagating the reported information comprises propagating the master network address entry forwarding table.

4. A method in accordance with claim 1, wherein maintaining network address entry forwarding tables further comprises tracking neighboring node hit bits using the slave blades.

5. A method in accordance with claim 4, wherein the neighboring node is a router using routing protocol, and further comprising using neighbor router communications with a next hop as confirmation of neighbor reachability for an end point destination.

6. A method in accordance with claim 1, wherein performing a sweep comprises simultaneously sweeping the slave blades.

7. A method in accordance with claim 1, wherein performing a sweep comprises progressively sweeping the slave blades.

8. A method in accordance with claim 1, wherein creating a report of slave blade forwarding table information comprises creating a report including the slave blade forwarding table.

9. A method in accordance with claim 1, wherein creating a report of slave blade forwarding table information comprises creating a report of network address entry state changes.

10. A method in accordance with claim 1, further comprising using an application-specific integrated circuit (ASIC) on the slave blades to perform packet forwarding operations.

11. A method in accordance with claim 1, further comprising performing each of the operations of the method using only hardware.

12. A method in accordance with claim 1, further comprising operating the blade packet manager in a host mode or a router mode.

13. A system for updating forwarding tables in a blade packet manager, comprising:
   a networkable blade chassis having a plurality of blades comprising a master blade and a plurality of slave blades, each blade being a part of a network data packet forwarding device and the slave blades being configured to forward network data packets;
   a master management module on the master blade configured to manage the network data packet forwarding device and host a central processing unit (CPU);
   a reporting module configured to perform a sweep of the plurality of slave blades for network address entry state changes and report the state changes to the master management module; and
   a state change propagation module associated with the master management module and configured to propagate the reported state changes from the master blade to the plurality of slave blades.

14. A system in accordance with claim 13, further comprising a timing module configured to track aging of network address entries and update forwarding tables.

15. A system in accordance with claim 13, further comprising an application-specific integrated circuit (ASIC) configured to identify incoming network data packets, perform an address lookup for incoming network data packet destinations and forward the incoming network data packets to the destinations.

16. A system in accordance with claim 13, wherein the network data packet forwarding device is operable as a network switch.

17. A system in accordance with claim 16, wherein the network switch is operable as a network router.

18. A system in accordance with claim 13, wherein the master management module hosts a routing protocol.

19. A system in accordance with claim 13, wherein the reporting module is configured to periodically perform a simultaneous or progressive sweep of the plurality of slave blades.

20. A system for updating forwarding tables in a blade packet manager, comprising:
   a master management module configured to manage master and slave network data packet forwarding tables on network devices;
   a reporting module in communication with the master management module and configured to perform a sweep of a plurality of slave forwarding tables for network address entry state changes and report the state changes to the master management module to update the master forwarding table; and
   a state change propagation module associated with the master management module and configured to propagate the updated state changes from the master forwarding table to the plurality of slave forwarding tables.

* * * * *